United States Patent
Ramakrishnan et al.

(10) Patent No.: US 8,161,329 B2
(45) Date of Patent: Apr. 17, 2012

(54) GENERATING RANDOM SEQUENCES BASED ON STOCHASTIC GENERATIVE MODEL HAVING MULTIPLE RANDOM VARIATES

(75) Inventors: Umasuthan Ramakrishnan, Banaswadi (IN); Krithikaa Krishnamoorthy, Portsmouth (GB); Albee Jhoney, Ejipura (IN)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 12/616,663

(22) Filed: Nov. 11, 2009

(65) Prior Publication Data
US 2011/0113288 A1 May 12, 2011

(51) Int. Cl.
G06F 11/00 (2006.01)
(52) U.S. Cl. .......................... 714/38.1; 714/32; 341/109
(58) Field of Classification Search .................. 714/25, 714/27, 32, 37, 38.1; 341/109; 703/2, 22
See application file for complete search history.

(56) References Cited

U.S. PATENT DOCUMENTS

| | | | |
|---|---|---|---|
| 4,852,023 A | 7/1989 | Lee et al. | |
| 4,944,009 A | 7/1990 | Micali et al. | |
| 5,222,142 A | 6/1993 | Kent | |
| 5,627,775 A | 5/1997 | Hong et al. | |
| 6,061,702 A | 5/2000 | Hoffman | |
| 6,188,294 B1 | 2/2001 | Ryan et al. | |
| 6,201,870 B1 | 3/2001 | Medard et al. | |
| 6,339,645 B2 | 1/2002 | Smeets | |
| 6,414,558 B1 | 7/2002 | Ryan et al. | |
| 6,735,239 B1 | 5/2004 | Niegel et al. | |
| 6,792,377 B1 | 9/2004 | Agrawal et al. | |
| 6,857,003 B2 | 2/2005 | Saito | |
| 6,954,770 B1 | 10/2005 | Carlson et al. | |
| 6,968,460 B1 | 11/2005 | Gulick | |
| 7,047,262 B2 | 5/2006 | Hars | |
| 7,392,213 B2 | 6/2008 | Merkoulovitch et al. | |
| 2004/0162725 A1* | 8/2004 | Ueda et al. | 704/236 |
| 2007/0094541 A1* | 4/2007 | Kang | 714/38 |
| 2008/0294941 A1* | 11/2008 | Copstein et al. | 714/38 |

OTHER PUBLICATIONS

L. Blum et al., "A simple unpredictable pseudo-random number generator," SIAM J'l on Computing, May 1986.
P. L'Ecuyer, "Tables of linear congruential generators of different sizes and good lattice structure," Mathematics of Computation, 1999.
G. Marsaglia, "A current view of random number generators," in Computer Science & Statistics: Procs. of the 16th Symp. on the Interface, 1985.
P. L'Ecuyer, "Maximally equidstributed combined Tausworthe generators," Mathematics of Computation, 1996.

(Continued)

Primary Examiner — Robert Beausoliel, Jr.
Assistant Examiner — Joseph D Manoskey
(74) Attorney, Agent, or Firm — Raymond Szeto (57) ABSTRACT

Random sequences are generated based on a stochastic generative model having multiple random variates. Inputs representative of the stochastic generative model are received. The inputs include a first random variate having a finite set of alphabets, a second random variate having a set of alphabets, and a third random variate having a finite set of alphabets. Outputs representative of the random sequences are generated based on the stochastic generative model. The outputs include a first random sequence that is a finite-length random sequence of alphabets randomly selected from the first random variate, a second random sequence having a set of alphabets selected from the second random variate, and a third random sequence having a set of alphabets randomly selected from the third random variate.

20 Claims, 3 Drawing Sheets

OTHER PUBLICATIONS

T.G. Lewis et al., "Generalized feedback shift register pseudorandom number algorithms," J'l of the ACM, 1973.

M. Matsumoto et a., "Twisted GFSR generators," ACM Trans. on Modeling & Comp. Simulation, 1992.

M. Matsumoto et al., "Twisted GFSR generators II," ACM Trans. on Modeling & Comp. Simulation, 1994.

M. Matsumoto et al., "Mersenne twister: A 623-dimensionally equidistributed uniform pseudo-random number generator," ACM Trans. on Modeling & Comp. Simulation, 1998.

P. L'Ecuyer et al., "Construction of equidistributed generators based on linear recurrences modulo 2," in Monte Carlo and Quasi-Monte Carlo Methods, 2000.

P. L'Ecuyer, "Uniform random number generation," in Simulation, 2006.

F. Panneton et al., "Improved long-period generators based on linear recurrences modulo 2," ACM Trans. on Mathematical Software, 2006.

F. Panneton et al., "On the xorshift random number generators," ACM Trans. on Modeling & Comp. Simulation 2005.

P. L'Ecuyer et al., "F2-Linear random number generators," available at Internet web site http://www.iro.umontreal.ca/~lecuyer/myftp/papers/f2lin.pdf, 2007.

A. Rambaut et al., "Sequence-Generator: An application for the Monte Carlo simulation of DNA sequence evolution along phylogenetic trees," Cabios, 1997.

A. Fog, "Simulation of evolution in structured populations: The Open Source Software Package Altruist," Biotech Software & Internet Report, vol. 1, No. 5, pp. 226-229, year 2000.

A. Fog, Pages from Internet web site http://www.agner.org/evolution, updated 2001.

J.L. Bentley et al., "Generating sorted lists of Random Numbers," ACM Trans. on Mathematical Software, 1980.

J.H. Mize, "Multiple sequence random number generator," Procs. of 6th Conf. on Winter Simulation, Jan. 1973.

H S Hong et al., "Algorithm 823: Implementing scrambled digital sequences," ACM Trans. on Mathematical Software, 2003.

X. Lui et al., "A Markov chain sequence generator for power macromodeling," Procs. of IEEE/ACM Int'l Conf. on Computer-Aided Design, 2002.

P. Bratley et al., "Algorithm 738: Programs to generate Niederreiter's low-discrepancy sequences," ACM Trans. on Mathematical Software, 1994.

H. Niederreiter, "Random number generation and quasi-Monte Carlo methods," SIAM, 1992.

I.M. Sobol, "The distribution of points in a cube and the approximate evaluation of integrals," USSR Comput. Math. Math. Phys., 1967.

H. Faure, "Discrepance de suites associees a un systeme de numeration (en dimension s)," Acta Arith., 1982.

L. Devroye, "Non-uniform random variate generation," New York: Springer-Verlag, 1986.

M.C. Cario et al., "Autoregressive to anything: Time series input processes for simulation," Operation Research Letters 19, 1996.

M.C. Cario et al., "Modeling and generating random vectors with arbitrary marginal distributions and correlation matrix," Technical report, Department of Industrial Engineering and Management Sciences, Northwestern University, Evanston, Illinois, 1997.

B. Deler et al., "Modeling and generating multivariate time series with arbitrary marginals using an autoregressive technique," Technical report, Department of Industrial Engineering and Management Sciences, Northwestern University, Evanston, Illinois, 2000.

J.A. Whittaker, "Stochastic software testing," Annals of Software Eng'g, 1997.

D. Marculescu, "Information theoretic and probabilistic measures for power analysis of digital circuits," Ph.D. dissertation, University of Southern California, Aug. 1998.

S. Apipattanavis et al., "A semiparametric multivariate and multisite weather generator," Water Resources Research, 1997.

S. Tezuka, "Uniform random numbers: Theory and practice," Kluwer Academic Publishers, Norwell, Massachusetts, USA, copyright 1995.

H. Niederreiter, "Random number generation and quasi-Monte Carlo methods," Society for Industrial & Applied Mathematics, Philadelphia, PA, copyright 1992.

* cited by examiner

GENERATING RANDOM SEQUENCES BASED ON STOCHASTIC GENERATIVE MODEL HAVING MULTIPLE RANDOM VARIATES

FIELD OF THE INVENTION

The present invention is generally related to generating random sequences of messages, which may be used to test a software entity that has an application programming interface (API). More particularly, the present invention is related to generating such random sequences based on a stochastic generative model having multiple random variates.

BACKGROUND OF THE INVENTION

The task of verifying the functionality of a software entity, such as a software component or a web service, which exposes an application programming interface (API), typically involves constructing a test model of the software entity, designing test cases, designing test data, developing test scripts, and executing the test cases using the test scripts in relation to the test model. Automating the generation of test cases and corresponding tests data, from a test model can, however, be difficult to achieve.

For instance, typically software entities are governed by a programming model that describes rules and guidelines for interacting with the entity. A test case for a software entity is a sequence of messages (i.e., an API operation) that can stimulate the system in a desirable or undesirable manner. Since a large system will have many interacting software entities, which can exchange combinations of messages among them, the programming model in question defines the boundary conditions that distinguish valid combinations from invalid combinations. In order to maximize the possibility of detecting defects, it can be desirable to generate random sequences of messages as test cases. However, a collection of the random sequences must nevertheless satisfy a probability distribution governed by the programming model. As such, generating random, or stochastic, test cases has however proven difficult to accomplish in practice.

SUMMARY OF THE INVENTION

The present invention relates to generating random sequences based on a stochastic generative model that has multiple random variates. The random sequences may be used to test a software entity that has an application programming interface (API), for instance. A method of one embodiment of the invention is thus for generating random sequences based on a stochastic generative model having multiple random variates. The method is implemented by one or more computer programs executed by one or more processors such that execution of the computer programs by the processors causes performance of the method.

The method receives inputs representative of the stochastic generative model. The inputs include: a first random variate having a finite set of alphabets; a second random variate having a set of alphabets; and a third random variate having a finite set of alphabets. The method generates outputs representative of the random sequences based on the stochastic generative model.

The outputs include a first random sequence, a second random sequence, and a third random sequence. The first random sequence is a finite-length random sequence of alphabets randomly selected from the first random variate. The second random sequence has a set of alphabets selected from the second random variate. The set of alphabets of the second random sequence correspond to each alphabet of the first random sequence. The third random sequence has a set of alphabets randomly selected from the third random variate. The set of alphabets of the third random sequence correspond to each alphabet in the first random sequence.

A computer program product of an embodiment of the invention stores one or more computer programs. The computer programs are executable by one or more processors to perform a method to generate random sequences, including a first random sequence, a second random sequence, and a third random sequence, based on a stochastic generative model having multiple random variates. The method reads inputs representative of the stochastic generative model.

The inputs include: a first random variate having a finite set of alphabets; a second random variate having a set of alphabets; and, a third random variate having a finite set of alphabets. The inputs further include a first relative probability of occurrence of each alphabet within the first random variate to be found in the first random sequence, as well as a positional population density of the alphabets within the second random variate to be found along a length of the first random sequence. The inputs also include a second relative probability of occurrence of each alphabet within the third random variate to be found in the third random sequence.

The method validates the positional population density, processes the inputs, and normalizes the first relative probability of occurrence and the second relative probability of occurrence. The method then performs the following for each current position of a number of positions of a length of each of the first, second, and third random sequences, from a first position to a last position. First, the method generates the current position of the first random sequence based on the inputs. Second, the method generates the current position of the second random sequence based on the inputs. Third, the method generates the current position of the third random sequence based on the inputs.

A computing system of an embodiment of the invention is for generating random sequences based on a stochastic generative model having multiple random variates. The computing system includes hardware and a random sequence generator implemented via the hardware. The random sequence generator receives inputs representative of the stochastic generative model, and generates outputs representative of the random sequences based on the stochastic generative model.

The inputs include: a first random variate having a finite set of alphabets; a second random variate having a set of alphabets; and, a third random variate having a finite set of alphabets. The outputs include a first random sequence that is a finite-length random sequence of alphabets randomly selected from the first random variate. The outputs also include a second random sequence having a set of alphabets selected from the second random variate. The set of alphabets of the second random sequence correspond to each alphabet of the first random sequence. The outputs further include a third random sequence having a set of alphabets randomly selected from the third random variate. The set of alphabets of the third random sequence correspond to each alphabet in the first random sequence.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

DEFINITIONS

In this section of the detailed description, various terms that are used throughout the remainder of the detailed description are defined in a general a non-limiting sense. Statistical randomness can be defined as a quality that a sequence has. In particular, a sequence is said to be statistically random when it contains no recognizable patterns or regularities. Examples of such sequences include the results of an ideal dice roll, as well as the digits of Pi.

A random sequence is a sequence of alphabets (selected from E) or numbers (selected from a range R), having a length L, where the following is true. L may be of infinite length or finite length. E is a set of independent or dependent alphabets. E is said to have independent alphabets, if its probability transition matrix is an identity matrix or a unit matrix. A probability transition matrix defines the probability of transitioning from one alphabet to another alphabet in a sequence, for all combinations. Some desired properties of random sequences can include unpredictability, a period length, a resolution, efficiency, and repeatability. Unpredictability is a very high degree of randomness, whereas as to period length, the longer the period the better. The resolution of the numbers in the sequence can be considered as multiples of $2^{-L}$, where $2^{-L}$ is the resolution for L fractional binary digits between [0, 1]. Efficiency is the length of the sequence generated per a unit of time, such as per second. Repeatability is the ability to replicate the same random sequence, which can be useful in repeating simulating experiments.

A pseudo-random sequence is a sequence that appears to be random, but is not. A quasi-random sequence progressively covers a d-dimensional space with a set of points that are uniformly distributed. A low-discrepancy sequence has the property that for all N, the sub-sequence $x_1, \ldots, x_N$ is almost uniformly distributed, where $x_1, \ldots, x_{N+1}$ is almost uniformly distributed as well.

A stochastic pattern can be defined as follows. Stochastic models are models involving or containing a random variable or variables, and involve chance or probability. A pattern is a perceptual structure or feature within a domain, which can be used to make or to generate things or parts of a thing. A stochastic pattern is thus a recognizable stochastic model exhibit by a thing within a domain. It can be used to generate things or parts of a thing that are—approximately or stochastically—similar to the original thing.

A variate is a generalization of a concept of a random variable defined without reference to a particular type of probabilistic experiment. It is defined as the set of all random variables that obey a given probabilistic law. A random variate generation algorithm for real numbers is a program that halts with probability one and exits with real number X.

Problem Statement

In this section of the detailed description, a description or statement of the problem that is solved by at least some embodiments of the present invention is formally described. A system includes the following input random variates: $\Omega$ having a finite set of alphabets $X_i$; $\psi$ having a set of alphabets $Y_i$; and, $\lambda$ having a finite set of alphabets $W_i$. The relationships among the random variates are as follows. $\Omega$ is dependent on $\lambda$, in that the alphabets in $\Omega$ describe and control the nature of and the number of alphabets sampled from $\lambda$. $\psi$ and $\lambda$ are independent of one another. $\psi$ is dependent on $\Omega$, in that some of the alphabets in $\Omega$, which are referred to as control alphabets, determine the creation and destruction or deletion of $Y_i$ alphabets in $\psi$, and where the rate of creation and destruction is defined for each control alphabet in $\Omega$.

The problem that is solved by at least some embodiments of the invention is to generate a multivariate sequence, as output, where each element in the sequence includes $\{S_i\{N_i\}, \{V_i\}\}$, and where the following is true: $S \rightarrow \{X_i\}$, i=1 to sequence length; $N_i \rightarrow \{Y_{(i,j)}\}$, j=1 to fy($X_i$); $V_i \rightarrow \{W_{(i,k)}\}$, k=1 to fw($X_i$). The function fy($X_i$) defines the length of $N_i$ for the given $X_i$, where the function fw($X_i$) defines the length of $V_i$ for the given $X_i$.

S is a finite-length sequence of alphabets random selected from $\Omega$, with the following embedded, known spatio-temporal stochastic patterns defined for each alphabet in the sequence. The first pattern is the relatively probability of occurrence of each alphabet in the string S, the second pattern is the positional probability density for each alphabet in the string S. The third pattern is the probability of co-occurrences of alphabets as a function of distance between them and order, in the string S. The fourth pattern is the positional population density of alphabets in $\psi$, due to the presence of control alphabets in S.

N is a random sequence with a set of alphabets selected from $\psi$, corresponding to each alphabet in the sequence S, with the following embedded and known spatio-temporal stochastic patterns defined for each alphabet in $\psi$. The first pattern is fy($X_i$), which is the number of alphabets from $\psi$, for $X_i$ in S. The second pattern is the distribution function describing the lifetime of alphabets in $\psi$.

V is a random sequence with a set of alphabets randomly selected from $\lambda$, corresponding to each alphabet in the sequence S, with the following embedded and known spatio-temporal stochastic patterns defined for each alphabet in $\lambda$. The first pattern is fw($X_i$), which is the number of alphabets from $\lambda$, for $X_i$ in S. The second pattern is the relative probability of occurrence of each alphabet, within the string V. The third pattern is the positional probability density for each alphabet, within the string V. The fourth pattern is the probability of co-occurrences of alphabets, as a function of distance between them and order, within the string V.

The method is to generate a final output sequence that is merged from the above three sequences: $\{<S, N, V>\}$. For example, an output sequence could be $\{<X_2, \{Y_0, Y_5, Y_1\}, \{W_2, W_6\}; <X_5, \{ \}, \{W_2, W_1\}>\}$. The following observations regarding the problem statement are further noted. First, $\Omega$, $\psi$, and $\lambda$ are representative random variates, in which a problem can include one of two things. First, the problem can include many $\lambda$ random variates, provided the $\lambda$'s are independent of one another and is independent of <$\Omega$ & $\psi$>. Second, the problem can include many random-variate tuples <$\Omega$, $\psi$>, provided they are independent of one another and are independent of $\lambda$'s in the system.

The second observation is that $\Omega$ is similar to $\lambda$, except for some alphabets that affect the random variate $\psi$. The third observation is that the system may include just the following types of stochastic patterns. The first type of stochastic pattern is the relative probability of occurrence of each alphabet in the generated string, which is applicable to $\Omega$ and $\lambda$. The second type is the positional probability density for each alphabet in the generated string, which is also applicable to $\Omega$ and $\lambda$. The third type is the co-occurrence probability of alphabets, as a function of distance between them and order, within the generate string, which is also applicable to $\Omega$ and $\lambda$.

The fourth type includes the pattern(s) described based on the relationship between the random-variable tuple <$\Omega$, $\psi$>. Such patterns of the fourth type include the positional population density of alphabets in $\psi$, due to the presence of control alphabets in the generated sequence S, which is applicable to $\Omega$. Such patterns of the fourth type also include the lifetime distribution of alphabets in $\psi$, due to the presence of control alphabets in the generated sequence S, which is applicable to $\psi$. The fifth type includes patterns in which the functions fy( ) and fw( ) for the alphabets in $\Omega$ just specifies the number of alphabets sampled from $\psi$ and $\lambda$ for the final output sequence.

Overview of Generating Random Sequences

Figure 1:
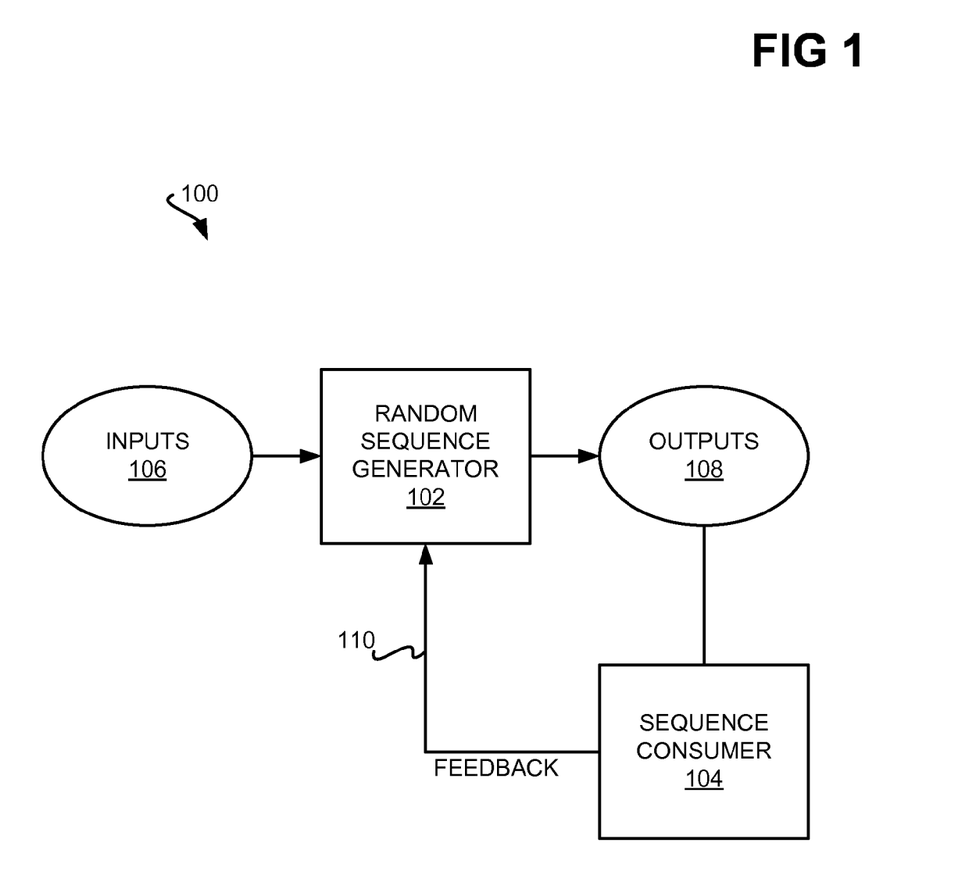
FIG. 1 is a diagram of a system for generating random sequences, according to an embodiment of the present invention.

FIG. 1 shows a system 100, according to an embodiment of the present invention. The system 100 includes a random sequence generator 102, and a sequence consumer 104. The random sequence generator 102 encapsulates a multivariate sequence generation model, and may be implemented in hardware, software, or a combination of hardware and software. The sequence consumer 104 may be a software entity, such as a software component or a web service, which has an application programming interface (API), and is the entity that is being tested within the system 100. The software entity may run on hardware.

In general, inputs 106 are provided to the random sequence generator 102, which correspondingly generates random or stochastic sequences as its outputs 108. The outputs 108 are the parameters and other inputs specified by the API of the sequence consumer 104 in one embodiment. Furthermore, in one embodiment, some degree of feedback 110 may be provided by the sequence consumer 104 to the random sequence generator 102, although this is not required. For instance, the feedback 110 may be based on outputs of the sequence consumer 104, which can then guide the random sequence generator 102 as to providing additional relevant random sequences for consumption by the consumer 104.

The random sequence generator 102 accepts the following generative model parameters as the inputs 106. The first input is $X_i$, which is the set of alphabets in $\Omega$. This set of alphabets includes $C_i$, which is a set of alphabets in $\Omega$ that will result in creation of $Y_i$ in $\psi$; $D_i$, which is a set of alphabets in $\Omega$ that will result in deletion of $Y_i$ from $\psi$; and, $Z_i$ defined as $X_i$ minus the union of $C_i$ and $D_i$. The second input is $Y_i$, which is the set of alphabets in $\psi$, and the third input is $W_i$, which is the set of alphabets in $\lambda$.

Additional generative model parameters that are part of the inputs 106 can include dependencies between $\Omega$ and $\psi$. Such dependencies include vector functions fy(C), fy(D), and fy(Z). The vector function fy(C) describes the creation characteristics of alphabets in C and the number of $Y_i$ created in $\psi$. The vector function fy(d) describes the deletion characteristics of alphabets in D and the number of $Y_i$ deleted from $\psi$. The vector function fy(Z) describes the operation characteristics of the alphabets in Z and is the number of $Y_i$ used by Z.

Additional generative model parameters that are part of the inputs 106 can include dependencies between $\Omega$ and $\lambda$, specifically the vector function fw(X). The vector function fw(X) describes the operation characteristics of alphabets in $\Omega$ and the number of $W_i$ used by X. Another generation model parameter that is part of the inputs 106 is a unique random sequence of numbers U within the range [0, 1], generated by a function $G_u$.

The outputs 108 generated by the random sequence generator 102 includes random sequences S, N, and V. The random sequence S is a sequence with alphabets from $\Omega$, and has a sequence length seq-len. The random sequence N is a sequence of an ordered collection of $Y_i$, with alphabets from $\psi$. The size of each entry in the sequence N is determined by the corresponding alphabets in S and fy( ) and the sequence N has the sequence length seq-len as well. The random sequence V is a sequence of an ordered collection of $W_i$, with alphabets from $\psi$. The size of each entry in the sequence V is determined by the corresponding alphabets in S and fw( ) and the sequence V has the sequence length seq-len, too.

The generative model of the random sequence generator 102 may also have the following stochastic pattern definitions, which may be built into the generator 102, or provided by the inputs 106, and which have to be presented in the generated output sequences. The first pattern is Rx, which is the relative probability of occurrence of $X_i$ in S, the second pattern is Px, which is the positional probability distribution for $X_i$ in S, and the third pattern is Mx, which is the probability distribution function describing a pair-wise co-occurrence of alphabets in S, as a function of distance between them.

A fourth pattern is Qy, which is the position population density of Y in $\psi$, along the length of the output sequence S, and a fifth pattern is Ty, which is a lifetime distribution function of the alphabets in $\psi$. A seventh pattern is Rw, which is the relative probability of occurrence of $W_i$ in V, an eighth pattern is Pw, which is the positional probability distribution for the $W_i$ in V, and a ninth pattern is Mw, which is the probability distribution function describing a pair-wise co-occurrence of alphabets in V, as a function of distance between them.

Furthermore, the generative model of the random sequence generator 102 may also have the following generative rules, which may be built into the generator 102, or provided by the inputs 106, and which prescribe the rules of generation of the generator 102. These rules include the presence or absence of $\lambda$ in the generative model, as well as the presence or absence of each of the following stochastic patterns in S: Rx, Px, Mx, and Qy. The rules further include the presence or absence of the stochastic pattern Ty in N, as well as the presence or absence of each of the following stochastic patterns in V: Rw, Pw, and Mw.

Figure 2:
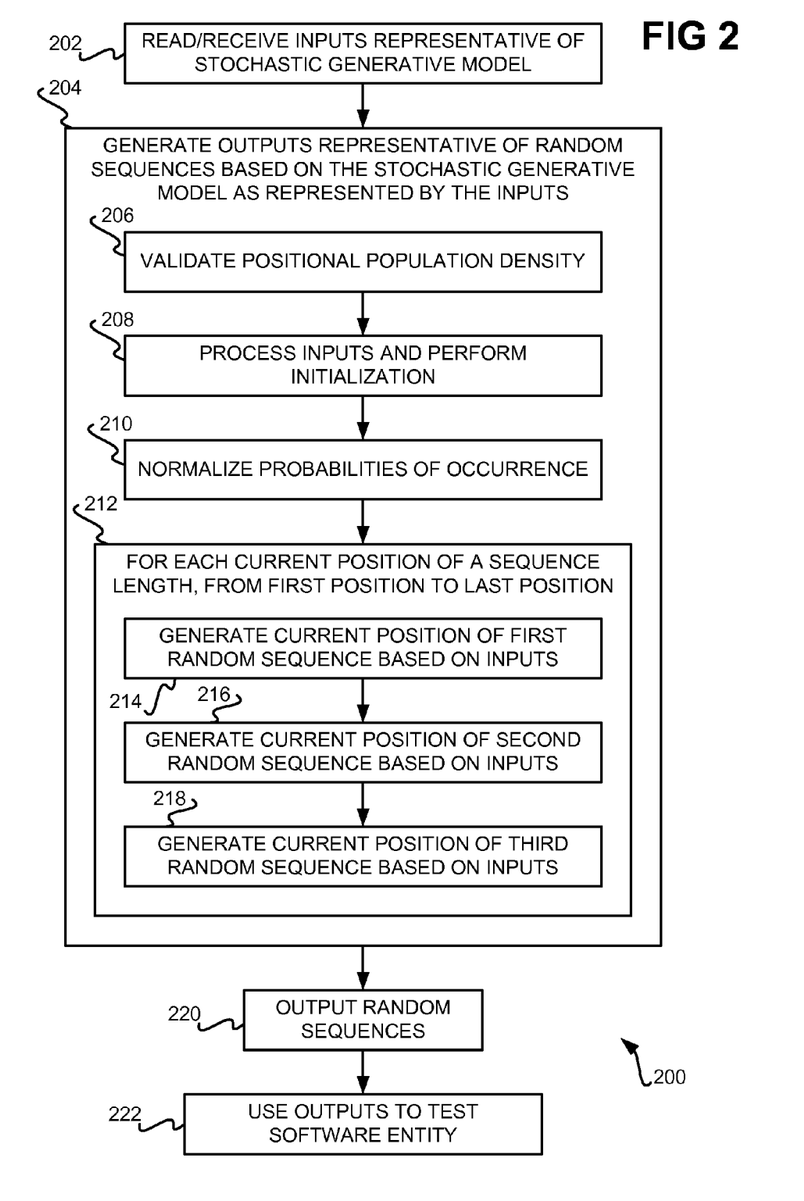
FIG. 2 is a diagram of a method for generating random sequences, according to an embodiment of the present invention.
Figure 3:
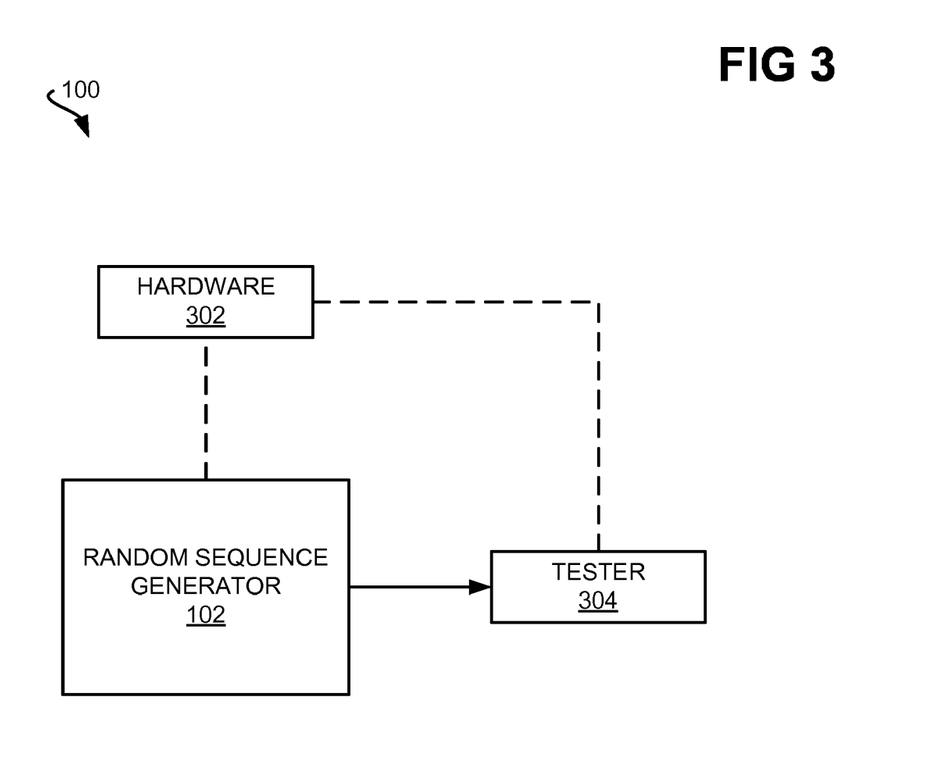
FIG. 3 is a diagram of a representative system, according to an embodiment of the present invention.

FIG. 2 shows a method 200, according to an embodiment of the invention. The method 200 is implemented as one or more computer programs, which are executed by one or more processors of one or more computing devices to perform the method 200. The method 200 receives and/or reads the inputs representative of the stochastic generative model that have been discussed (202). In response, the method 200 generates outputs representative of random sequences, based on the stochastic generative model as represented by the inputs, as has also been discussed (204).

In one embodiment, part 204 of the method 200 is performed as follows. The position population density Qy is validated (206), to determine whether this expected Qy is achievable, based on the knowledge of the ability of the alphabets in C and D to create and/or delete elements, respectively, in ψ. The inputs are then processed and initialization is performed (208). For instance, processing may include analyzing the input for the presence or absence of the stochastic patterns (Rx, Px, Mx, Qy, Ty, Rw, Pw, and Mw), and initializing these patterns with default values. Likewise, the output sequences S, N, and V is initialized, an age vector Yage for the alphabets in ψ is initialized, and the actual population of $Y_i$ in ψ, represented as Ay, is initialized. The probabilities of occurrence—i.e., the vectors Rx and Rw—are then normalized (210).

Thereafter, for each current position of a sequence length ranging from a first position in each sequence to a last position in each sequence—i.e., 0<=k<seq-len—the following is performed (212). The current position of the first random sequence, $S_k$, is generated based on the inputs (214). More specifically, the input vector Px is normalized for the k-th position, and the probability distribution vector for the alphabets in Ω, Py, is determined based on the expected population of $Y_i$ in ψ (i.e., $Qy_k$) and on the actual population of $Y_i$ (i.e., Ay). The probability distribution vector for alphabets in Ω, MPx, is also determined, based on the co-occurrence probability Mx for the previously generated alphabets in S. The overall probability distribution vector of Ω for the k-th position of S is then determined, keeping in mind any applicable generative rules, which may be represented as $G_R$. The overall probability distribution vector is VPx, and is equal to Rx×Px×MPx×Py. Finally, $S_k$ is obtained by sampling the non-uniform random variate Ω having the probability distribution vector VPx for an alphabet, using the uniform random variate U.

The current position of the second random sequence, $N_k$, is also generated based on the inputs (216). More specifically, $N_k$ is obtained by sampling the non-uniform random variate ψ having the age distribution vector Yage, for $fy(S_k)$ alphabets. As part of part 216, Ay may also be determined as the modified population of $Y_i$ in ψ. Finally, the current position of the third random sequence, $V_k$, is generated based on the inputs as well (218). More specifically, the input vector Pw is normalized for the k-th position, and the probability distribution vector for alphabets in ψ, MPw, is also determined, based on the co-occurrence probability Mw for the previously generated alphabets in V. The overall probability distribution vector of λ for the k-th position of V is then determined, keeping in mind any applicable generative rules, which may be represented as $G_R$. The overall probability distribution vector is VPw, and is equal to Rw×Pw×MPw. Finally, $V_k$ is obtained by sampling the non-uniform random variate λ having the probability distribution vector VPw for $fw(S_k)$ alphabets.

The random sequences are then output (220). That is, {$S_k$}, {$N_k$}, {$V_k$}} is output for 0<-k<seq-len. These outputs can then be used to test a software entity, for instance (222). In particular, elements from the sequence S, N, and V form tuples <s, n, v> that are used as input for a sequence consumer, such as a software entity represented by a simulation engine or a system being tested. It is noted that in the method 200, generating $S_k$ and generating $N_k$ are used to sample the random-variate tuple <Ω, ψ> to generate $S_k$ and $N_k$, respectively. Furthermore, generating $V_k$ is used to sample the λ random variate, to generate $V_k$.

The method 200 can be extended for additional random variates, in addition to Ω, ψ, and λ, provided that such additional random variates subscribe to the properties described in the problem statement above. That is, for all additional random-variate(s), which are similar to λ and there is a need to generate a corresponding sequence comparable to $V_k$, the method 200 is extended to provide additional such sequence in the same way as $V_k$ is generated. Likewise, for all additional random-variate tuples, which are similar to <Ω, ψ>, the method 200 can be extended to provide additional generations of sequences comparable to $S_k$ and $N_k$, in the same way as $S_k$ and $N_k$ are generated.

It is further noted that the random variates in the generative model are assumed to operate on a sample space with finite and uniquely identifiable elements. Another assumption is that the size of the in-memory representation of the distribution function associated with the random variates is limited by a given system's memory. A third assumption is that interference between random variates—particularly between the probability distribution functions—may exist within the generative model but will not be discovered by the generator.

It is finally noted that the generation of random or stochastic sequences via the method 200 has various measurable desirable characteristics. These characteristics include repeatability, which is that a given random sequence is reproducible for the same input data values. These characteristics also include faithfulness, which is that a stochastic pattern is faithfully reproduced within the resulting sequences for non-interfering patterns. These characteristics finally include extensibility, which is that multiple random sequences are efficiently generated. Tests performed by the inventors on an embodiment of the invention show that high repeatability, faithfulness, and extensibility are provided, which is an advantage of the present invention.

EXAMPLE

In the context of software entity testing, the test input vector used to verify the behavior of the entity in question is a series of tuples <$O_j$, $M_i$, $P_k$>. $M_i$ is an application program interface (API) method of the software component, $O_j$ is the target entity (i.e., state variable), and $P_k$ includes parameters of the method $M_i$. In a simplified scenario a multivariate sequence generator can use a random-sequence-generation approach to generate a series of methods from M, objects from O, and parameter values from domain D. However, in actuality, a programming model of the software entity typically imposes various constraints on the API.

Such constraints include the order of invocation of the methods. For example, in socket programming, a typical program will open a socket, then open an input stream, then read from the stream, then close the stream, and finally close the socket. Another constraint is the parameter passing between method invocations in a call sequence. In the previous example, for instance, the read-from-stream operation needs the output of the previous operation (namely, the open-stream operation) as its input parameter. This is a type of feedback that has been described in the previous section of the detailed description. A third constraint includes the initialization and exit conditions of the state variables, if the software entity being tested is a stateful software entity.

In the context of software entity testing, then, ψ is a finite, discrete sample space including all the entities (i.e., target object instances) that the API methods will operate on, where Y is the discrete random variable on ψ. Furthermore, λ is a finite, discrete sample space including all the data values that the API methods will use as parameters, where W is the discrete random variable on λ. Additionally, Ω is a finite, discrete sample space including all the API methods of the software entity, where X is the discrete random variable representing all of Ω, and where fy is a function that describes the operation characteristics of the API method in Ω, and which maps an API method in Ω to a random collection of entities in ψ for its execution.

Also in the context of software entity testing, C is the discrete random variable representing the set of all the creation API methods in Ω. The execution of the creation API methods results in the addition of uniquely identifiable entities Y to ψ. Fy(c) is a function that describes the creation characteristics of the API method in Ω. Fy(c) maps an API method in Ω to a random collection of entities in ψ after its execution.

Furthermore, D is the discrete random variable representing the set of all destruction or deletion API methods in Ω. The execution of these API methods results in the removal of uniquely identifiable entities Y from ψ. Fy(D) is a function that describes the deletion characteristics of the API method in Ω. Fy(D) maps an API method in Ω to a random collection of entities in ψ before its execution.

Furthermore, other sample spaces include ξ, η, and χ. The sample space ξ includes all the random sequences of API methods (from Ω), where each operates on an entity selected from ψ. S is a discrete random variable representing all of ξ. The sample space η includes all the random sequences of entities (from ψ) to be operated on by the API methods selected from Ω. N is a discrete random variable representing all of η. The sample space χ includes all the random sequences of entities (from λ) to be used as parameter values by the API methods selected from Ω. V is a discrete random variable representing all of χ.

Detailed Embodiments for Generating Random Sequences

In this section of the detailed description, detailed embodiments for generating random sequences using stochastic generative models are presented. In its simples form, a multivariate sequence generator ζ maps a random list of <X> (from Ω) to S (from ξ), maps a random list of <Y> (from ψ) to N (from η), and maps a random list of <W> (from λ) to V (from χ). The length of S, N, and V are the same, and the elements of S, N, and V form a sequence of tuples <s, n, v> for the sequence consumer. The stochastic patterns in the resulting sequences S, N, and V are known a priori to the generator ζ, and are referred to as a stochastic generative model, or SGM, herein.

The SGM includes multiple random variables, such as X, Y, W, S, N, and V), by sampling from the respective random spaces (such as Ω, ψ, ξ, η, and χ) as described by an expected arbitrary probability, or EAD. The EAD are the embedded stochastic patterns in S, N, and V. The SGM can be incrementally constructed by analyzing each random variate and its associated EAD as follows.

First, R(X) is the EAD of $X_i$ in Ω, where R is the relative probability of occurrence of each element from Ω, in the sequence S. For example, if R follows a uniform distribution function, then all the elements in Ω will have an equal probability of occurrence in the sequence S, generated by the generator. In another example, if Ω is the set of $\{X_1, X_2, X_3, X_4,$ and $X_5\}$ and the corresponding R(X) is $\{0.2, 0.1, 0.05, 0.05,$ and $0.6\}$, then the random sequence generator takes into account this non-uniform distribution function while generating the sequence. Hence, the generated sequence will have more $X_5$ than $X_1, X_2, X_3,$ and $X_4$, in that order.

Second, P(X, t) is the EAD of $X_i$ in Ω, at time T=t. In other words, the relative probability of occurrence of each element from Ω is dependent on its position in the generated random sequence S. For example, Ω may be a set of $\{X_1, X_2, X_3, X_4,$ and $X_5\}$ and the probability density function may vary with time $t_n$ in which the change in the probability of occurrence of $X_1$ occurs at $T=t_0, t_1, \ldots, t_N$. The change in the probability of occurrence of $X_i$ along the t-axis (i.e., the index position in the sequence) acts as an EAD pattern P(X, t) for the sequence generator. For example, the EAD pattern may state that $X_5$ will not occur at $T_3, T_4, T_7,$ and $T_8$, since the probability of occurrence is zero. The EAD pattern as another example may state that at $T=T_6$, the arbitrary probability distribution pattern can be read as $X_1=0.3, X_2=0.1, X_3=0.3, X_4=0,$ and $X_5=1$. After normalization, this can be transformed into an arbitrary non-uniform probability distribution function that influences the sequence generation.

Third, $M(X_n, X_m, d)$ is the EAD that governs the probability of occurrence of $X_m$ at position m in the sequence S, as a function of distance d, given the occurrence of $X_n$ at position n, where m>n. This aspect of the stochastic model describes the affinity (or repulsion) between two elements of Ω as a function of its distance d, as well as the order of occurrence of the elements of Ω. For example, if $M(X_n, X_m, d)$ follows an exponential probability density ($\lambda e^{-\lambda x}$), where d is 1/λ, given the occurrence of $X_n$ (at n), a smaller value of d will influence the generator to generate $X_m$ as close to $X_n$ as possible. Similarly, this also influences the order of occurrence in S.

Fourth, Q(Y, t) is the population density (i.e., EAD) of $Y_t$ in ψ, at time T=t. The population density of elements in ψ can thus vary along the length of S. Therefore, P(Y, t) has an indirect impact on the distribution and occurrences of C and D within the sequence S. For example, if Q(Y, t) follows a normal distribution, then the generated application programming interface (API) method sequence initially has higher density of elements from C, to ensure an increase in population density in accordance with such a distribution. The latter half of the random sequence has a higher density of elements from D, to again ensure reduction in population and conform to the normal distribution. Therefore, the rate of change of the EAD population density function determines the positional probability distribution function of the elements in C and D.

Initially, the generator is based on equal probability of occurrences of all elements Ω (including C and D) in S. Subsequent occurrences of elements from C and D are affected by the EAD Q(Y, t) as follows. First, a positive rate of change in the population density function means that the probability of occurrences of an element from C has to be greater than D, and the magnitude is determined by the rate of change. Second, a negative rate of change in population density gives a higher probability of occurrences of an element from D than from C.

Fifth, T(y) is the EAD of the lifetime of an entity from ψ in Y. If S is the sequence selected by the generator, the lifetime distribution T(Y) will have an impact on the selection of Y's in the corresponding sequence N generated by the same generator. Primarily, the occurrences of elements from D in S impacts the choice of the Y's in N, to ensure adherence to T(Y). For example, if T(Y) follows a normal distribution, the following is true. For every occurrence of an alphabet from C in the control sequence C, creations of Y's in ψ result. Furthermore, for every occurrence of an alphabet from X (other than C or D) within the control sequence S, a random selection of Y elements from ψ results, depending on the number of Y elements needed by the element (from X). Finally, for every occurrence of an alphabet from D in the control sequence S, a random selection of Y elements from ψ results, such that the termination time of the randomly selected Y elements follows T(Y)—the normal distribution function. That is, from the sample space ψ, entities are sampled such that the age of the selected Y elements fit T(Y)—the normal distribution function.

Sixth, R(W) is the EAD of $W_i$ in λ, where R is the relative probability of occurrence of each element from λ, within the sequence V. Seventh, P(W, t) is the EAD of $W_i$ in λ, at time T=t. That is, the relative probability of occurrence of each element from $\lambda$ is dependent on its position in the generated random sequence V. Eighth, $M(W_n, W_m, d)$ is the EAD that governs the probability of occurrence of $W_m$ at position m in the sequence V, as a function of distance d, given the occurrence of $W_n$ at position n, where m>n.

In summary, then, the SGM is a combination of the following random variates (and one or more of their associated EAD's). The first random variate is X, where R(X) is the relative probability of occurrence of elements from $\Omega$ in S, P(X, t) is the positional probability distribution of elements from $\Omega$ in S, and $M(X_n, X_m, d)$ is the affinity description function between $X_n$ and $X_m$ as a function of distance d. The second random variate is Y, where Q(Y, t) is the positional population density function of elements Y in $\psi$, and T(Y) is the expected lifetime of elements Y in $\psi$. The third random variate is W, where R(W) is the relatively probability of occurrence of elements from $\lambda$ in V, P(W, t) is the positional probability distribution of elements from $\lambda$ in V, and $M(W_n, W_m, d)$ is the affinity description function between $W_n$ and $W_m$ as a function of distance d.

A multivariate sequence generator thus accepts the SGM as input, and generates the following sequences. The first sequence is S, which is an ordered list of elements from $\Omega$, such as $\{X_3, X_5, X_1, X_4, X_2\}$. The second sequence is N, which for each element of S, includes a list of elements from $\xi$, such as $\{\{Y_3, Y_2, Y_1\}, \{\}, \{Y_4, Y_6\}, \{Y_5\}, \{Y_6, Y_1, Y_2\}, \{Y_3\}\}$. The third sequence is V, which for each element of S, includes a list of elements from $\chi$, such as $\{\{W_1, W_5, W_3\}, \{W_4\}, \{W_5, W_1\}, \{W_6, W_1\}, \{\}\}$.

Characteristics of the SGM include spatio-temporal characteristics of the EAD, as follows. R(X) specifies a spatial distribution along the X dimension, which affects the choice of elements from $\Omega$ uniformly at all positions within the sequence S, has a temporarily uniform and global impact for all t, and has spatially arbitrary and global impact for all elements of X. P(X, t) specifies spatial (along the X dimension) and temporal (along the t dimension) distribution. P(X, t) affects the choice of elements from $\Omega$ differently at each position in the sequence S, has a temporally arbitrary and local impact determined by the t variable in the distribution function, and has a spatially arbitrary and local impact determined by the X variable in the distribution function.

$M(X_n, X_m, d)$ specifies a temporal distribution across two elements in X, and affects the choice of elements from $\Omega$ depending on the occurrence of $X_n$ in S for a duration D. $M(X_n, X_m, d)$ has a temporally arbitrary and localized impact for duration d and a spatially and localized impact for just two points in space. $M(X_n, X_m, d)$ can temporally interfere with itself, in situations where $X_n$ is generated within the given duration d. Furthermore, one $M(X_n, X_m, d1)$ can interfere with another $M(X_n, X_m, d2)$, in situations where $X_p$ is generated within the given duration d1.

Q(Y, t) specifies the temporal distribution of Y along the t dimension. Q(Y, t) indirectly affects the choice of elements from $\Omega$ (particularly elements in C and D) at each position in the sequence S, and affects the choice of elements from $\psi$ at each position in N, since it results in the creation of new elements in $\psi$. Q(Y, t) has temporally arbitrary and global impact for all t, and a spatially arbitrary and localized impact on the elements in C and D.

T(Y) specifies the temporal distribution of Y along the t dimension, and affects the choice of elements from $\psi$ at each position in N. T(Y) has a temporally arbitrary and global impact for all t, and a spatially arbitrary and localized impact on the elements $\psi$. R(W) specifies a spatial distribution along the W dimension, and affects the choice of elements from $\psi$ uniformly at all positions in the sequence V. R(W) has a temporally uniform and global impact for all t. R(W) further has a spatially arbitrary and global impact for all elements of W.

P(W, t) specifies spatial distribution along the W dimension and temporal distribution along the t dimension. P(W, t) affects the choice of elements from $\psi$ differently at each position in the sequence S. P(W, t) has a temporally arbitrary and local impact determined by the t variable in the distribution function, and a spatially arbitrary and local impact determined by the W variable in the distribution function.

$M(W_n, W_m, d)$ specifies a temporal distribution across two elements in W, and affects the choice of elements from $\Omega$ depending on the occurrence of $W_n$ in V for a duration d. $M(W_n, W_m, d)$ has a temporally arbitrary and localized impact for duration d, and a spatially arbitrary and localized impact for just two points in space. $M(W_n, W_m, d)$ can temporally interfere with itself, in situations where $W_n$ is generated within the given duration d. Furthermore, one $M(W_n, W_m, d1)$ can temporally interference with another $M(W_n, W_m, d)$ in situations where $W_p$ is generated within the given duration d1. It is noted that the term arbitrary as used herein refers to a non-linear function.

It is noted that an SGM with more than one EAD—namely R(X), P(X, t), $M(X_n, X_m, d)$, Q(Y, t), T(Y), R(W), P(W, t), and $M(W_n, W_m, d)$—will results in non-linear stochastic interference. That is, for a given position within the generated sequence S (or N or V), more than one EAD will affect the occurrence of an element from X (or Y or W). These interference fields can result in unpredictable behavior.

There are two aspects of interference that can affect whether an SGM behaves predictably. The first aspect is the region of interference. Overlapping regions of interference may result in unpredictable behavior, whereas non-overlapping regions do not. A region is defined by the range in the t-dimension and in the X- (or Y-) dimension. For example, a region $R_1$ could be defined as $[3<t<6, \{X_2, X_5\}]$, and another region $R_2$ as $[0<t<3, \{X_1, X_3, X_6\}]$, and a third region $R_3$ $[5<t<8, \{X_3, X_5\}]$. In this example, $R_1$ and $R_2$ are non-overlapping, whereas $R_1$ and $R_3$ overlap.

The second aspect is the nature of the interference. A conflicting region of interference may result in unpredictable behaviors, whereas a converging region of interference does not. An example of a conflict is, for a given position in S, where $R(X_3)$ requires a very high probability of occurrence of $X_3$ whereas $P(X_3)$ requires a very low probability of occurrence of $X_3$. An SGM is thus said to have interference if and only if, there exist overlapping regions in the EAD, and the EAD is conflicting in these overlapping regions. A multivariate sequence generator performs predictably for non-interfering EAD's within the SGM.

A multivariate sequence generator has two following core operations, which are referred to herein as uniform-to-arbitrary (U2A) mapping and random-select (RSelect). As to the first operation, OutVal is defined by U2A (InVal, OutSet, Px). Specifically, InSet is a sample space having values in the range [0, 1]. InVal is a discrete input variate on InSet, with a uniform probability distribution. OutSet is a sample space having discrete elements, and OutVal is the discrete random variable on OutSet, with an arbitrary probability distribution Px.

The operation U2A can be effectuated as follows. First, the input <Px> of length $L_x$ is sorted in ascending order, and the vector <OutSet> is arranged in the same sorted order as <Px>. Next, a range matrix of Rng dimension $L_x \times 2$ is prepared, where $Rng_i[0]$ holds minValue and $Rng_i[1]$ holds maxValue of the range. The Rng is filled with values from the sorted Px, as follows. Rng[0]=0 and Rng[1]=$Px_0$. For all i, $0<I<L_x$, $Rng_i[0]=Rng_{i-1}[1]$ and $Rng_i[1]=Rng_i[0]+Px_{i+1}$. Third, the input InSet is mapped to OutSet, and the OutVal of the given InVal is determined as follows. If ($Rng_i[0]<=Rng_i[1]$), where i=0 to $L_x$, then OutVal=OutSet[i], else OutVal=the null set. Finally, OutVal is returned.

As to the second operation, OutVal is defined by RSelect (aSet, inAge, outDist, outSize). <aSet> is a sample space having discrete elements (i.e., an ordered collection); <inAge> associates a number to the elements of <aSet>, which is interpreted as the age of an element in <aSet>. <OutVal> is a discrete random variate on <aSet>, having a probability distribution described by <outDist>, and <outDist> is a distribution function over the age of the elements in <aSet>. For example, a distribution function can be defined as follows:

$$P_{outDist} = \begin{cases} 0.0 & t < 5 \\ 0.2*(t-5) & 5 \leq t \leq 10 \\ 1.0 & t > 10 \end{cases}$$

Here, the <outDist> vector determines and stores the values within the range [5, 10], and assumes the edge values are copied for the rest of the age-ranges. Finally, <outsize> is the maximum number of elements sampled by <outVal> from <aSet>. RSelect may return a partial list, or even a null list, if the <inAge> does not have sufficient values that satisfy the distribution prescribed by <outDist>.

The operation RSelect can be effectuated as follows. First, a uniform random variate iRand is initialized to generate random numbers within the value range [0, 1]. Next, for all k, 0<k<=outsize, the following is performed. The input <inAge> is sorted in ascending order, and the input <aSet> is rearranged in this same order. The mxAge and mnAge values are determined from <inAge> such that mnAge is the least value in the sorted <inAge> vector and mxAge is the largest value in the sorted <inAge> vector. The value of <outDist> is copied to a probability distribution vector VPx for the age range [mnAge, mxAge], where the index of VPx maps to the age value. Wx is prepared with weights for each index value of VPx by counting the number of elements in <aSet> with the index value (or the age value) in inAge; i.e.:

$\forall i, (mnAge \leq i \leq mxAge),$ $Wx_i \mapsto \{count(aSet_k) \ni inAge_k = i \forall k\}$ The weighted VPx is then normalized such that:

$$\forall i, (mnAge \leq i \leq mxAge), \sum_i VPx_i \times Wx_i \equiv 1$$

An index vector iVect is prepared, such that for all k, mnAge<=k<=mxAge, $iVect_k$=k. A random integer number is generated in the range [1, mxAge], and which follows a distribution <VPx>. Thus, rIndex=U2A ($iRand_k$, iVect, VPx), and if rIndex is equal to the empty set, then $outVal_k$ is set to the empty set. However, if rIndex is not equal to the empty set, then an element is selected randomly from the subset of elements in <aSet> that have the same rIndex in <inAge>, and they are stored in outVal; i.e.:

$aSubSet \mapsto \{\forall k \exists aSet_k \ni inAge_k = rIndex\}$ $outVal_k \mapsto$ random select an element from $\{aSubSet\}$ In this latter step, for the element $outVal_k$, its corresponding entry is removed from <aSet>. Finally, <outVal> is returned.

To conclude the detailed embodiment for generating random sequences in this section of the detailed description, the method 200 of FIG. 2 is referred to once again, in more particular but in consistent fashion than as has been described above. The method 200 generates the random sequences S, N, and V, from the given $\Omega$, $\psi$, and $\lambda$, given X, R(X), P(X, t), $M(X_n, X_m, d)$, given Y, Q(Y, t), and T(Y), and given W, R(W), P(W, t), and $M(W_n, W_m, d)$.

First, inputs representative of the SGM are read or otherwise received (202). The inputs include the following. One input is a vector <X> of length $L_x$, having elements from $\omega$ that include a vector <C>, a function $fy(C_i)$, a vector <D>, a function $fy(D_i)$, and a vector <Z>. The vector <C> is of length $L_C$, with creation elements from $\Omega$; the occurrence of an element from <C> in outSeq results in the creation of Y in $\psi$. The function $fy(C_i)$ determines the number of Y's created by $C_i$. The vector <D> is of length $L_d$, having destruction elements from $\Omega$; the occurrence of an element from <D> in outSeq results in the deletion of Y in $\psi$. The function $fy(D_i)$ determines the maximum number of Y's to be deleted by $D_i$, whereas the vector <Z> is of length $L_Z$ (defined as $L_x$-$L_C$-$L_D$) and has elements from $\{X\}-\{C\}-\{D\}$.

Another input includes a uniform random sequence variate U, which generates a pseudo-random sequence <inSeq> of Length $L_{IN}$(=$L_{OUT}$), with range [0, 1]. An input vector <Y> has length $L_Y$ input vector <Y> has length $L_Y$ with elements from $\psi$. An input vector <W> has length $L_W$ with elements from $\lambda$.

Additional inputs include the expected arbitrary probability distribution (EAD), including a vector <Rx>, a matrix <Px>, an indexed collection of vectors $Mx(X_n, X_m)$, a vector <Qy>, a vector <Ty>, a vector <Rw>, a matrix <Pw>, and an indexed collection of vectors $Mw(W_n, W_m)$. The vector <Rx> is of type double[ ] and has length $L_x$, and represents an arbitrary non-uniform discrete probability distribution. The matrix <$P_x$> is also of type double, has dimensions $L_x \times L_{IN}$, and represents an arbitrary distribution pattern of each $X_i$ along the length of the output sequence (or time axis). The value range is [0, 1], and the sum of all the values along the time axis need not be 1.

The collection $Mx(X_n, X_m)$ is indexed by the tuple <$X_n$, $X_m$>, and has a value that is a vector representing an arbitrary affinity pattern between $X_n$ and $X_m$ along the length of the output sequence (or time axis). The elements of the vector are of type double[ ], and have values within the range [−1, 1]. The value of 0 indicates no affinity or repulsion, whereas positive values indicate affinity and negative values indicate repulsion. Values closer to 1 indicate greater affinity as compared to values closer to 0. Likewise, values closer to −1 indicate greater repulsion as compared to values closer to 0. The length of the vector describes the depth of the dependency between $X_n$ and $X_m$. The vector for <$X_n$, $X_m$> need not be the same as <$X_m$, $X_n$>, since the former captures the relative affinity of $X_m$, given the occurrence of $X_n$, and the latter captures the relative affinity of $X_n$, given the occurrence of $X_m$.

The vector <Qy> is of type double[ ] and has a length $L_{IN}$. This vector represents an expected arbitrary non-uniform population density of Y's along the length of the output sequence (or time axis). The index of the vector represents the time line, and the vector's values are positive numbers, representing the population of Y's in $\psi$. The initial absolute population of Y in $\psi$ can be 0 (or $Qy_0$), however.

The vector <Ty> represents the expected lifetime distribution function of Y's in ψ over the age of elements in ψ. For example, the distribution function can be defined as follows:

$$Ty = \begin{cases} 0.0 & t < 5 \\ 0.2*(t-5) & 5 \le t \le 10 \\ 1.0 & t > 10 \end{cases}$$

In this case, the Ty vector determines and stores the value within the range [5, 10], and assumes the edge values are copied for the remainder of the age ranges.

The vector <Rw> is of type double[ ] and has a length $L_w$. This vector represents an arbitrary non-uniform discrete probability distribution. The matrix <Pw> is also of type double, and has dimensions $L_w \times L_{IN}$. This matrix represents an arbitrary distribution pattern of each $W_i$ along the length of the output sequence or time axis. The range of the values is [0, 1], and the sum of all the values along the time axis does not have to be 1. Finally, $Mw(W_n, W_m)$ is an indexed collection of vectors, where the index is a tuple $<W_n, W_m>$, and its value is a vector that represents an arbitrary affinity pattern between $W_n$ and $W_m$ along the length of the output sequence or time axis.

Still referring to FIG. 2, outputs are generated that are representative of the random sequences, based on the SGM as represented by the inputs (204). Specifically, these outputs include pseudo-random sequences S, N, and V all having the length $L_{OUT}$. The sequence S is a vector of elements from Ω. The sequence N is a vector of collections of elements from ψ. The sequence V is a vector of collections of elements from λ.

The outputs are generated as follows. First, the position population density, or Qy, if provided is verified or validated (206). Specifically, it is verified that the rate of positive change of values in Qy is less than the maximum possible number of Y's that can be created by a $C_i$ in <C>. That is, Max of Fy(C), for all <C>, $$\forall i \ni c_i \in C, fy(c_i) \to \psi: \|\psi_i\| - \|\psi_{i-1}\|$$

$$\forall k \ni DQy_k \to Qy_k - Qy_{k-1}$$

$$\exists \max(fc_i) \le \max(DQy_k) \forall DQy > 0$$

It is further verified that the rate of negative change of values in Qy is less than the maximum possible number of Y's that can be deleted from ψ by and $d_i$ in <D>. That is, Max of Fy(d), for all <D>, $$\cdot i \ni d_i \in D, fy(d_i) \to \psi: \|\psi_i\| - \|\psi_{i-1}\|$$

$$\cdot k \ni DQy_k \to Qy_k - Qy_{k-1}$$

$$\exists \max(|fd_i|) \ge \max(|DQy_k|) \forall DQy > 0$$

A failure is reported if either of these conditions cannot be met. While the method 200 can continue after reporting failure, faithfulness as to the specified population profile cannot be guaranteed in this instance.

Next, the inputs are processed and initialization is performed (208). The output sequences S and N are each initialized as an empty list { }. If input Rx is not provided, an Rx vector of length $L_x$=1 is created. If Mx is provided, $Lx_{MaxDepth}$—the maximum depth of the vectors in Mx—is determined. If Qy is provided, the desired population change vector, DQy is determined as, for all I, (0<I<$L_{IN}$), $DQy_i = Qy_i - Qy_{(i-1)}$. Furthermore, if Qy is provided, the mean $\mu_{DQy}$ is determined, and the standard deviation $\sigma_{DQy}$ is determined, for the desired population change vector DQy. More specifically, $\mu_{DQy}$ is the mean of $DQy_i$, where 0<i<$L_{in}$, and $\sigma_{DQy}$ is the standard deviation of $DQy_i$, where 0<i<$L_{in}$.

Furthermore, for all X elements in Ω, a Y contribution vector YC is prepared as follows. First, if the element in Ω is a member of D, then –fy(D) is copied into the corresponding position of the YC vector. That is, $$\forall i \ni d_i \in D$$

$$\exists x_j \in X \wedge d_i = x_j : D \subset X$$

$$YC_i \mapsto -fy(d_i)$$

Second, if the element in Ω is a member of Z, then 0 is copied into the corresponding position of the YC vector. That is, $$k \to \text{sizeof}(YC)$$

$$\forall i \mapsto z_i \in Z$$

$$\exists x_j \in X \wedge z_i = x_j : Z \subset X$$

$$YC_{k+i} \mapsto 0$$

Third, if the element in Ω is a member of C, then the Fy(C) is copied into the corresponding position of the YC vector. That is, $$k \to \text{sizeof}(YC)$$

$$\forall i \ni c_i \in C$$

$$\exists x_j \in X \wedge c_i = x_j : C \subset X$$

$$YC_{k+i} \mapsto fy(c_i)$$

Part 208 of the method 200 concludes as follows. For all Y elements in ψ, a Yage vector is initialized as zero. Finally, the variable Ay, representing the actual population of Y, is also initialized to zero. Next, the probabilities of occurrence are normalized (210). That is, the input vector Rx and the input vector Rw are each normalized. Specifically, the input vector Rx is normalized such that:

$$\forall i, (0 \le i < L_x), \sum_i Rx_i \equiv 1,$$

And the input vector Rw is normalized such that:

$$\forall i, (0 \le i < L_w), \sum_i Rw_i \equiv 1.$$

Next, for each current position of the sequence length, from the first position to the last position—that is, for each position k (0<=k<$L_{OUT}$) the following is performed (212). First, the current position of the random sequence S, $S_k$, is generated based on the inputs (214). If Px is provided, Px is prepared by normalizing the k-th vector within the input matrix Px, such that:

$$\forall i, (0 \le i < L_x), \sum_i Px_{(i,k)} \equiv 1.$$

If Qy is provided, Py is prepared by determining the probability distribution for the elements of <C>, <D>, and <Z>, based on the actual population of Y (Ay at position k), and expected population ($Qy_{k+1}$), as follows. The probabilities Pc, Pd, and Pz, which are the probabilities of an element from <C>, <D>, and <Z>, respectively, are each initialized to zero.

The probability distribution vector for all elements in <X> is also initialized in part 214:

$$\forall i \ni x_i \in X, Py_{(i,k)} \to 0.$$

Next, the desired population change DPQy is determined as $Qy_{k+1} - Ay$, and if DPQy is zero, then the probability Py for each element in <X> is determined as:

$$\forall i (0 \leq i < L_x) \ni x_i \in Z, Py_{(k,i)} \to 1/\text{sizeOf}(Z)$$

$$\forall j (0 \leq j < L_x) \ni x_j \in D \cup C, Py_{(k,j)} \to 0$$

If DPQy is positive, then the probability Py is determined for each element in <X>, using DPQy as the mean and $\sigma_{DQy}$ as the deviation of a normal distribution function as follows:

$$\forall i (0 \leq i < L_x) \ni x_i \in C \cup Z$$

$$Py_{(k,i)} \to \frac{1}{\sigma_{DQy}\sqrt{2\pi}} \exp\left(-\frac{(YC_i - DPQy)^2}{2\sigma_{DQy}^2}\right).$$

$$\forall j (0 \leq j < L_x) \ni x_j \in D, Py_{(k,j)} \to 0$$

By comparison, if DPQy is negative, then the probability Py for each element in <X> is determined using DPQy as the mean and $\sigma_{DQy}$ as the deviation of a normal distribution function as follows:

$$\forall i (0 \leq i < L_x) \ni x_i \in D \cup Z$$

$$Py_{(k,i)} \to \frac{1}{\sigma_{DQy}\sqrt{2\pi}} \exp\left(-\frac{(YC_i - DPQy)^2}{2\sigma_{DQy}^2}\right).$$

$$\forall j \ni x_j \in C, Py_{(k,j)} \to 0$$

Finally, the determined Py for all <X> is normalized, such that:

$$\forall i, (0 \leq i < L_x), \sum_i Py_i \equiv 1.$$

Still referring to part 214 of the method 200, if Mx is provided, MPx is prepared. First, a co-occurrence matrix CMx is prepared based on the EAD, Mx for all the previously generated values in S. This entails initializing the co-occurrence matrix CMx (dimension $L_x \times \min(Lx_{MaxDepth}, k)$) with 0.5 in all of its cells, and for all i, $0 <= m < \min(Lx_{MaxDepth}, k)$, if there exists a valid vector for the tuple $<S_{k-m}, X_i>$ in Mx, setting CMx(i, m) to $(Mx<S_{k-m}, X_i>(m)+1)/2.0$. Second, a VPatx vector is prepared using the co-occurrence matrix Mx. That is, for all I, $0<=I<L_x$, VPatx$_i =$ $$\prod_m^{\min(L_{MaxDepth},k)} CMx(i,m).$$

Third, MPx is determined from VPatx, by normalizing VPatx, such that:

$$\forall i, (0 \leq i < L_x), \ni$$

$$MPx_i \mapsto \begin{cases} VPatx_i / \sum_k^{L_x} VPatx_k & \sum_k^{L_x} VPatx_k \neq 0. \\ 0 & \sum_k^{L_x} VPatx_k \equiv 0 \end{cases}$$

Fourth, VPx, the arbitrary probability distribution vector having dimension $L_x$ is determined by copying the resulting normalized vector. For all I ($0<=i<L_x$), VPx$_i$ is initialized to Rx$_i$; if $Q_y$ is provided then VPx$_i$ is set to VPx$_i \times$Py$_{(i,k)}$; if Mx is provided then VPx$_i$ is set to VPx$_i \times$MPx$_i$; and, if Px is provided then VPx$_i$ is set to VPx$_i \times$Px$_{(i,k)}$. Finally, VPx is normalized. Fifth, random values are generated for the k-th position in <S>, using inSeq, via $S_k = U2A(\text{inSeq}_k, X, VPx)$.

Next, the current position of the random sequence N, $N_k$, is generated for $S_k$ (216), as follows. If $S_k \in C$, then new Y elements are added to ψ, as dictated by Fy($S_k$), the actual population Ay is updated with the new value, and the Yage vector is augmented with additional values to cater to the new Y elements in ψ, such that the corresponding age value is initialized to zero. If $S_k \notin$ the union of C and D, then $N_k$ is determined via RSelect(Y, Yage, U, fz($S_k$)), where U is a uniform sequence of length $L_Y$ with each value equal to one, and fz($S_k$) is the number of elements to be selected. If inSeq$_{pos} \in D$, then, if Ty is provided, $N_k$ is set as RSelect(Y, Yage, Ty, Fy($S_k$)), and if Ty is not provided, $N_k$ is set as RSelect(Y, Yage, U, Fy($S_k$)); furthermore, the Y elements listed in $N_k$ are removed from ψ, the corresponding entries in the Yage vector are removed, and the actual population Ay is updated with the new value. Finally, the entries in the Yage vector are incremented by one.

Finally, the current position of the random sequence V, $V_k$, is generated (218), as follows. If Pw is provided, Pw is prepared by normalizing the k-th vector in the input matrix Pw, such that:

$$\forall i, (0 \leq i < L_w), \sum_i Pw_{(i,k)} \equiv 1.$$

If Mw is provided, MPw is prepared as follows. A co-occurrence matrix CMw is prepared based on the EAD, Mw, for all the previously generated values in V. This entails initializing a co-occurrence matrix CMw having dimensions $L_w \times \min(Lw_{MaxDepth}, k)$ with 0.5 in all its cells, and for all i, $0<=i<L_w$, and for all m, $0<=m<\min(Lw_{MaxDepth}, k)$, if there exists a valid vector for the tuple $<V_{k-m}, W_i>$ in Mw, then setting CMw(I, m) as $(Mw<V_{k-m}, W_i>(m)+1)/2.0$. Next, MPw is continued to be prepared by preparing a VPatw vector using the co-occurrence matrix Mw, such that for all i, $0<=I>L_w$, VPatw$_i =$ $$\prod_m^{\min(Lw_{MaxDepth},k)} CMw(i,m).$$

Finally, MPw is continued to be prepared by determining MPw from VPatw, by normalizing VPatw such that:

$$\forall i, (0 \le i < L_w), \ni$$

$$MPw_i \mapsto \begin{cases} VPatw_i / \sum_k^{L_w} VPatw_k & \sum_k^{L_w} VPatw_k \ne 0. \\ 0 & \sum_k^{L_w} VPatw_k \equiv 0 \end{cases}$$

Still in part 218, the arbitrary population vector VPw, having the dimension $L_w$, is determined by copying the resulting normalized vector. That is, for all I ($0<=I<L_w$), $VPw_i$ is initialized to $Rw_i$; if Mw is provided then $VPw_i$ is set as $VPw_i \times MPw_i$; if Pw is provided then $VPw_i$ is set as $VPw_i \times Pw_{(i,k)}$. VPw is then normalized via:

$$\forall i, (0 \le i < L_w), \sum_i VPw_i \equiv 1.$$

Part 214 of the method 200 concludes by generating $V_k$ for $S_k$, such that $$\forall i, (0 \le i < fw(S_k)),$$

$r$Val→random sample from [0,1] with uniform distribution, $$V_k \rightarrow \{V_k : U2A(r\text{Val}, W, VPw)\}$$

Where $fw(S_k)$ is the number of elements sampled from W for a given $S_k$.

The method 200 continues by outputting the random sequences that have been generated (220). These sequences are the sequences S, N, and V. Finally, these outputs (i.e., the random sequence S, N, and V) can be used to test a software entity (222), in one embodiment of the invention, as has been described.

General System, Implementation Details, and Conclusion

In this final section of the detailed description, FIG. 4 shows the system 100 of FIG. 1 in a very general representation, according to an embodiment of the invention. In addition to the random sequence generator 102, the system 100 includes hardware 302 and a tester 304. The hardware 302 may include processors, memory, and other types of hardware commonly found in computing devices, as can be appreciated by those of ordinary skill within the art. As such, either the random sequence generator 102, the tester 304, or both the generator 102 and the tester 304 are implemented via the hardware 302.

The random sequence generator 102 is implemented as has been described, by performing the methods of embodiments of the invention that have described above. The tester 304, by comparison, can be used to test a sequence consumer, such as the sequence consumer 104 of FIG. 1, which is not depicted in FIG. 4. For instance, the sequence consumer may be a software entity exposing an application programming interface (API). As such, the tester 304 uses the outputs of the random sequence generator 102 as inputs to the API to test the software entity in question.

As can be appreciated by one those of ordinary skill within the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

At least some embodiments of the present invention thus generate multivariate random sequences that have arbitrary stochastic patterns. The expected arbitrary stochastic patterns that are to be presented in the generated sequences may be taken as inputs. As such, a test engineer can describe a test model for API testing stochastically, using a multivariate simulation input model. The stochastic test model can describe the test conditions, such as the relative probability of occurrence of a test message in a test vector, a positional probability of every test message in the test vector, the probability of co-occurrences of two or more test messages, and the order of co-occurring test messages. The test vector is a sample of this test model. The random sequences generated are thus instances from the test model to be used to stochastically test the API of a software entity.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For example, while embodiments have been described in general terms, and an example has been provided in which the random sequences generated (with embedded spatio-temporal stochastic patterns) may be used to test a software entity having an application programming interface (API), other examples are also amenable to embodiments of the invention. For instance, embodiments of the invention are amenable to a food web model that is used by ecologists, as just one example among many others, such as any type of simulation system. As such and therefore, it is manifestly intended that this invention be limited only by the claims and equivalents thereof.

We claim:

1. A method to generate random sequences based on a stochastic generative model having multiple random variates, the method implemented by one or more computer programs executed by one or more processors such that execution of the computer programs by the processors causes performance of the method, the method comprising:
   receiving a plurality of inputs representative of the stochastic generative model, the inputs comprising:
      a first random variate having a finite set of alphabets;
      a second random variate having a set of alphabets; and,
      a third random variate having a finite set of alphabets;
   generating a plurality of outputs representative of the random sequences based on the stochastic generative model, by the processors executing the computer programs, the outputs comprising:
      a first random sequence, the first random sequence being a finite-length random sequence of alphabets randomly selected from the first random variate;
      a second random sequence having a set of alphabets selected from the second random variate, the set of alphabets of the second random sequence corresponding to each alphabet of the first random sequence; and,
      a third random sequence having a set of alphabets randomly selected from the third random variate, the set of alphabets of the third random sequence corresponding to each alphabet in the first random sequence.

2. The method of claim 1, further comprising using the outputs to test a software entity running on hardware that exposes an application programming interface (API), the software entity tested by using the outputs as inputs to the API.

3. The method of claim 1, wherein the inputs further comprise, regarding the first random variate:
   a first subset of alphabets of the first random variate that result in creation of the set of alphabets of the second random variate;
   a second subset of alphabets of the first random variate that result in deletion of the set of alphabets of the second random variate; and,
   a third subset of alphabets of the first random variate that is equal to the finite set of alphabets of the first random variate minus the union of the first subset of alphabets and the second subset of alphabets.

4. The method of claim 3, wherein the inputs further comprise, regarding dependencies between the first random variate and the second random variate:
- a first vector function describing creation characteristics of the alphabets within the first subset;
- a second vector function describing deletion characteristics of the alphabets within the second subset; and,
- a third vector function describing operation characteristics of the alphabets within the third subset.

5. The method of claim 1, wherein the inputs further comprise:
- regarding dependencies between the first random variate and the third random variate, a vector function describing operation characteristics of the alphabets within the first random variate; and,
- a uniform random sequence of numbers within a range [0, 1].

6. The method of claim 1, wherein the inputs further comprise a plurality of stochastic pattern definitions comprising:
- a first relative probability of occurrence of each alphabet within the first random variate to be found in the first random sequence;
- a first positional probability distribution for each alphabet within the first random variate to be found in the first random sequence;
- a first probability distribution function describing a pair-wise co-occurrence of the alphabets to be found within the first random sequence;
- a positional population density of the alphabets within the second random variate to be found along a length of the first random sequence;
- a lifetime distribution function of the alphabets within the second random variate;
- a second relative probability of occurrence of each alphabet within the third random variate to be found in the third random sequence;
- a second positional probability distribution of each alphabet within the third random variate to be found in the third random sequence; and,
- a second probability distribution function describing a pair-wise co-occurrence of the alphabets to be found within the third random sequence.

7. The method of claim 6, wherein the inputs further comprise a plurality of generative rules prescribing how the outputs are to be generated based on the inputs, the generative rules comprising:
- a presence or absence of the third random variable within the stochastic generative model;
- a presence or absence of each of a plurality of first stochastic patterns within the first random sequence, the first stochastic patterns comprising the first relative probability of occurrence, the first positional probability distribution, the first probability distribution function, the positional population density;
- a presence or absence of a second stochastic pattern within the second random sequence, the second stochastic pattern comprising the lifetime distribution function; and,
- a presence of absence of each of a plurality of third stochastic patterns within the third random sequence, the third stochastic patterns comprising the second relative probability, the second positional probability, and the second probability distribution function.

8. The method of claim 1, wherein a size of each entry in the second random sequence is controlled by at least the alphabets within the first random sequence, and a size of each entry of the third random sequence is controlled by at least the alphabets within the first random sequence.

9. A computer program product comprising a non-transitory computer-readable storage medium storing one or more computer programs, the computer programs executable by one or more processors to perform a method to generate random sequences, including a first random sequence, a second random sequence, and a third random sequence, based on a stochastic generative model having multiple random variates, the method comprising:
- reading a plurality of inputs representative of the stochastic generative model, the inputs comprising:
  - a first random variate having a finite set of alphabets;
  - a second random variate having a set of alphabets;
  - a third random variate having a finite set of alphabets;
  - a first relative probability of occurrence of each alphabet within the first random variate to be found in the first random sequence;
  - a positional population density of the alphabets within the second random variate to be found along a length of the first random sequence; and,
  - a second relative probability of occurrence of each alphabet within the third random variate to be found in the third random sequence;
- validating the positional population density;
- processing the inputs;
- normalizing the first relative probability of occurrence and the second relative probability of occurrence;
- for each current position of a plurality of positions of a length of each of the first, second, and third random sequences, from a first position to a last position,
  - generating the current position of the first random sequence based on the inputs;
  - generating the current position of the second random sequence based on the inputs; and,
  - generating the current position of the third random sequence based on the inputs.

10. The computer program product of claim 9, wherein the method further comprises outputting the first, second, and third random sequences.

11. The computer program product of claim 9, wherein the method further comprises using the outputs to test a software entity running on hardware that exposes an application programming interface (API), the software entity tested by using the outputs as inputs to the API.

12. The computer program product of claim 9, wherein the inputs further comprise:
- regarding dependencies between the first random variate and the third random variate, a vector function describing operation characteristics of the alphabets within the first random variate; and,
- a uniform random sequence of numbers within a range [0, 1].

13. The computer program product of claim 12,
- wherein the inputs further comprise, regarding the first random variate:
  - a first subset of alphabets of the first random variate that result in creation of the set of alphabets of the second random variate;
  - a second subset of alphabets of the first random variate that result in deletion of the set of alphabets of the second random variate; and,
  - a third subset of alphabets of the first random variate that is equal to the finite set of alphabets of the first random variate minus the union of the first subset of alphabets and the second subset of alphabets,
- and wherein the inputs further comprise, regarding dependencies between the first random variate and the second random variate:

a first vector function describing creation characteristics of the alphabets within the first subset;
a second vector function describing deletion characteristics of the alphabets within the second subset; and,
a third vector function describing operation characteristics of the alphabets within the third subset.

14. The computer program product of claim 13, wherein the inputs further comprise a plurality of stochastic pattern definitions comprising:
a first positional probability distribution for each alphabet within the first random variate to be found in the first random sequence;
a first probability distribution function describing a pair-wise co-occurrence of the alphabets to be found within the first random sequence;
a lifetime distribution function of the alphabets within the second random variate;
a second positional probability distribution of each alphabet within the third random variate to be found in the third random sequence; and,
a second probability distribution function describing a pair-wise co-occurrence of the alphabets to be found within the third random sequence.

15. The computer program product of claim 14, wherein the inputs further comprise a plurality of generative rules prescribing how the outputs are to be generated based on the inputs, the generative rules comprising:
a presence or absence of the third random variable within the stochastic generative model;
a presence or absence of each of a plurality of first stochastic patterns within the first random sequence, the first stochastic patterns comprising the first relative probability of occurrence, the first positional probability distribution, the first probability distribution function, the positional population density;
a presence or absence of a second stochastic pattern within the second random sequence, the second stochastic pattern comprising the lifetime distribution function; and,
a presence of absence of each of a plurality of third stochastic patterns within the third random sequence, the third stochastic patterns comprising the second relative probability, the second positional probability, and the second probability distribution function.

16. The computer program product of claim 14, wherein generating the current position of the first random sequence comprises:
normalizing the first position probability distribution for the current position;
determining a probability distribution vector for the alphabets within the first random variate, based on the positional population density and on an actual population of the alphabets within the second random variate;
determining a probability distribution vector for the alphabets within the first random variate based on the first probability distribution function;
determining an overall probability distribution vector for the alphabets within the first random variate for the current position of the first random sequence; and,
sampling the first random variate via the probability distribution vector, using the uniform random sequence of numbers, to generate the current position of the first random sequence.

17. The computer program product of claim 14, wherein generating the current position of the second random sequence comprises:
sampling the second random variate via an age-distribution vector, using the first vector function, to generate the current position of the second random sequence; and,
determining a modified population of the alphabets within the second random variate.

18. The computer program product of claim 14, wherein generating the current position of the third random sequence comprises:
normalizing the second position probability distribution for the current position;
determining a probability distribution vector for the alphabets within the third random variate based on the second probability distribution function;
determining an overall probability distribution vector for the alphabets within the third random variate for the current position of the third random sequence; and,
sampling the third random variate via the probability distribution vector to generate the current position of the first random sequence.

19. A computing system to generate random sequences based on a stochastic generative model having multiple random variates, comprising:
hardware;
a random sequence generator implemented via the hardware, the random sequence generator to receive a plurality of inputs representative of the stochastic generative model, and to generate a plurality of outputs representative of the random sequences based on the stochastic generative model,
wherein the inputs comprise:
a first random variate having a finite set of alphabets;
a second random variate having a set of alphabets; and,
a third random variate having a finite set of alphabets,
and wherein the outputs comprise:
a first random sequence, the first random sequence being a finite-length random sequence of alphabets randomly selected from the first random variate;
a second random sequence having a set of alphabets selected from the second random variate, the set of alphabets of the second random sequence corresponding to each alphabet of the first random sequence; and,
a third random sequence having a set of alphabets randomly selected from the third random variate, the set of alphabets of the third random sequence corresponding to each alphabet in the first random sequence.

20. The computing system of claim 19, further comprising a tester to test a software entity exposing an application programming interface (API), the software entity tested by using the outputs as inputs to the API.

* * * * *